United States Patent Office 3,301,770
Patented Jan. 31, 1967

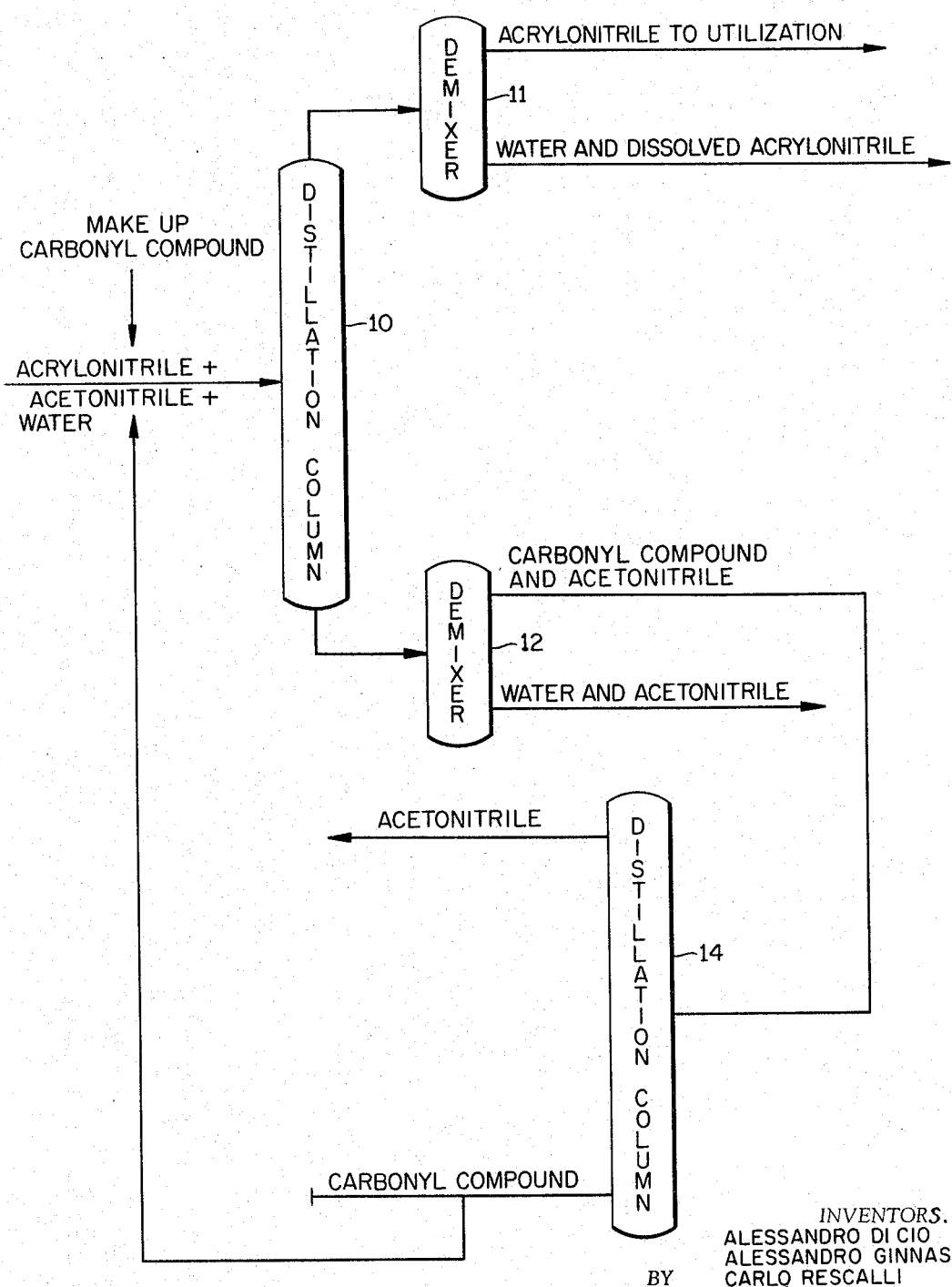

3,301,770
PROCESS FOR PURIFYING ACRYLONITRILE FROM ACETONITRILE
Alessandro Di Ciò, San Donato Milanese, and Alessandro Ginnasi and Carlo Rescalli, Milan, Italy, assignors to SNAM S.p.A., Milan, Italy, a company of Italy
Filed Sept. 3, 1963, Ser. No. 306,322
Claims priority, application Italy, Sept. 4, 1962, 17,606/62, Patent 692,787
8 Claims. (Cl. 203—54)

This invention relates to a process for purifying acrylonitrile. More particularly it relates to a process for the separation of acrylonitrile from a mixture of acrylonitrile and acetonitrile.

It is known that acrylonitrile obtained by the propylene-ammonia-oxygen process contains, as predominant impurity, some acetonitrile in percentages up to 10%.

Most of the separation methods proposed heretofore encounter difficulties which affect their economic advantage, particularly if a pure acrylonitrile is desired.

Owing to the proximity of their boiling points (which differ by only 4° C.) the said two anhydrous nitriles are not easily separable from each other by distillation, since for obtaining a highly pure product it would be necessary for the distillation columns to have an exceptionally high number of plates.

Also fractional distillation of the nitrile-water azeotropes does not lead to a satisfactory result. The difference between the boiling points of the acrylonitrile-water and acetonitrile-water azeotropes is only 6° C. and in this case also it is very difficult to recover pure acrylonitrile with good yields.

There is also known a purifying process based on stripping, using water as solvent. In this process the relative volatility of the acetonitrile present in the mixture decreases to such an extent as to make possible the recovery of pure acrylonitrile.

We have unexpectedly found that if a mixture of acrylonitrile, acetonitrile and water is subjected to a simple fractional distillation in the presence of a particular ketone or aldehyde, the relative volatility of acetonitrile decreases to such an extent as to allow a quantitative recovery of substantially pure acrylonitrile.

This decrease of the acetonitrile volatility is much greater than that obtained in the case of stripping with water. The present invention affords, therefore, the advantage of securing a perfectly quantitative separation between the two nitriles by a simple distillation under very elastic and mild operation conditions.

In accordance with this invention there is provided a process for separating acrylonitrile from a mixture containing acrylonitrile and acetonitrile which comprises distilling the mixture of the two nitriles in the presence of water and an aliphatic, aromatic, aralkylic or heterocyclic carbonyl compound having a boiling point above 100° C.

In the process of the invention, we preferably use rectification column having from 10 to 20 plates under reflux ratios from 1 to 5. The water/nitrile and ketone/nitrile (or aldehyde/nitrile) ratios can vary over so large a range that it is possible to apply this type of purification either to nitriles in the presence of the water just necessary to obtain azeotropes, or to aqueous 2–3% solutions of nitriles, i.e., to the solutions obtained by absorbing the reaction products in acidulated water, these solutions being usually subjected to stripping.

It is to be noted that by distilling an arcrylonitrile-acetonitrile-acetone mixture a good separation of the components is not obtained.

Surprisingly, if the mixture is distilled in the presence of water, we obtain a head fraction of acrylonitrile, water and acetone which is free from acetonitrile. However, the percentage of acrylonitrile in the head fraction is very low, and the purification is rather difficult.

These difficulties disappeaer if we use a ketone or aldehyde, either aliphatic, aromatic, aralkylic or heterocyclic, whose boiling point is above 100° C., and preferably between 130° and 200° C.

By distilling a mixture consisting of acrylonitrile, acetonitrile and a ketone (or an aldehyde) having the aforesaid features, in the presence of water, we have found that in the head of the column we obtain the acrylonitrile-water azeotrope, at 71° C., free from acetonitrile and from carbonyl compound.

After the recovery of an azeotropic fraction free from impurities, containing about 97% of the initial acrylonitrile, we obtain a fraction containing acrylonitrile, acetonitrile-water, and this fraction may be recycled in order to wholly recover the acrylonitrile, and, finally, we collect the acetonitrile-water azeotrope.

The discharged carbonyl compound is easily recoverable since it is insoluble in cold water and, after a simple demixing, it is recyclable to the column. The water which is separated does not contain nitriles.

We have successfully used various ketones and aldehydes; amongst these, acetylacetone, acetophenone, cyclohexanone, benzaldehyde, and furfural have shown particular efficaciousness.

In the absense of water the separation does not occur and the head fraction is acrylonitrile containing acetonitrile.

In the runs carried out we established the complete absence of carbonyl compound in the head fractions of the distillation. This is due to the fact that the ketones and aldehydes used by us or their possible azeotropes with water have remarkably higher boiling points than the acrylonitrile-water or acetonitrile-water azeotropes. Obviously, the process of this invention is applicable either to batch operations, or to continuous operations.

The single attached drawing is a diagrammatic illustration of one method of operating according to the teachings of the present invention.

The mixture of acrylonitrile, acetonitrile, water and the carbonyl compound is introduced into the distillation column 10 about midway the height of the column. The head fraction is an acrylonitrile-water azeotrope, free from acetonitrile and from the carbonyl compound. This fraction is delivered to a demixer 11, from whence the acrylonitrile is drawn off for utilization, and the remainder, consisting of water and dissolved acrylonitrile, is recycled. The carbonyl compound mixed with acetonitrile is drawn off from the bottom of the distillation column 10 and is delivered to a demixer 12 in which a mixture of the carbonyl compound and acetonitrile is separated from the water and traces of acetonitrile. The mixed carbonyl compound and acetonitrile is then delivered to a distillation column 14, from the head of which acetonitrile is delivered, and from the bottom of which the carbonyl compound is drawn off. The carbonyl compound is then recirculated to help make up the charge of the distillation column. With the described arrangement the process can be effected on a continuous basis.

In order to best illustrate the invention, the following examples are given.

*Example 1*

In this run, acetophenone was used in a 20 theoretical plate column, under a reflux ratio $R=2$. The ratios were:

—acrylonitrile/acetonitrile ratio, by weight=19
—water/nitriles ratio, by weight=1
—acetophenone/nitriles ratio, by weight=1

Under those conditions we obtained at 71° C. an acrylonitrile-water azeotropic fraction completely free from acetonitrile corresponding to 97% of the initial acrylonitrile. A further fraction containing acrylonitrile, acetonitrile and water was then collected up to 75° C., and this fraction was recycled for the whole recovery of the acrylonitrile. At 76° C. we obtained the acetonitrile-water azeotrope, and it was thus also possible to recover the acetonitrile. The ketone discharged from the reaction vessel after demixing was wholly recovered; and the water mixed with it did not contain nitriles.

Example 2

This was a run operated under particularly unfavourable conditions using an aqueous 3% solution of nitriles, in a 20 theoretical plate column, under a reflux ratio $R=5$, acrylonitrile/acetonitrile ratio=19, water/nitriles ratio=35, acetophenone/nitriles ratio=1.8, it was possible to directly recover 95% of the initial acrylonitrile. Also in this instance, the whole recovery of acrylonitrile is secured by recycling a second fraction containing the two nitriles and water. As in Example 1 the acetonitrile and ketone were then recovered.

Example 3

In a further run carried out in a 20 theoretical plate column under a reflux ratio $R=2$, acrylonitrile/acetonitrile ratio=19, water/nitriles ratio=0.13 (water needed by the acrylonitrile-water and acetonitrile-water azeotropes), acetophenone/nitriles ratio=1, we recovered directly 92% of the initial acrylonitrile substantially pure. With a second recyclable fraction, the whole acrylonitrile was recovered. In this instance, the ketone, was discharged substantially anhydrous and was easily recovered.

Example 4

In this run acetylacetone was used, always in a 20 theoretical plate column, under a reflux ratio $R=2$, acrylonitrile/acetonitrile ratio=19, water/nitriles ratio=1, and acetylacetone/nitriles ratio=1. We obtained an azeotropic acrylonitrile-water fraction at 71° C., which was free from acetonitrile and consisted of 97% of the initial acrylonitrile. Also in this instance a mixed azeotropic recyclable fraction was collected; and then at 76° C., we obtained the acetonitrile-water azeotrope. The fed ketone demixed from water was wholly recovered, whilst the water was free from nitriles.

Example 5

This run was carried out in the presence of cyclohexanone in a 20 theoretical plate column under a reflux ratio $R=2$, acrylonitrile/acetonitrile ratio=19, water/nitriles ratio=1, cyclohexanone/nitriles ratio=1. An azeotropic acrylonitrile-water fraction was directly collected, which corresponded to 89% of the initial acrylonitrile. The remaining acrylonitrile was recovered from a second fraction containing also acetonitrile and water and easily recyclable. After the acetonitrile recovery as an azeotrope with water, the fed ketone was separated from water by demixing. In this instance, however, the demixed water contained cyclohexanone in an amount corresponding to the solubility thereof (2.4 g./100 cc. $H_2O$).

Example 6

In this run benzaldehyde was used in a 20 theoretical plate column under a reflux ratio $R=2$, acrylonitrile/acetonitrile ratio=19, water/nitriles ratio=1, and benzaldehyde/nitriles ratio=1. We collected an azeotropic acrylonitrile-water fraction at 71° C. from which was obtained 98% of the initial acrylonitrile wholly freed from acetonitrile. A second acrylonitrile-acetonitrile-water fraction, easily recyclable, assured the whole recovery of the acrylonitrile, whilst at 76° C. the acetonitrile-water azeotrope distilled. Also in this instance the benzaldehyde is easily recoverable by demixing from water, in which it is insoluble.

We claim:

1. A process for separating acrylonitrile from a mixture containing acrylonitrile and acetonitrile which comprises distilling the mixture of the two nitriles in the presence of water and of a carbonyl compound selected from the group consisting of acetophenone, cyclohexanone, acetylacetone, benzaldehyde, and furfural, and having a boiling point between 130° C. and 200° C., to obtain as a head fraction acrylonitrile-water azeotrope, and recovering the acrylonitrile from the azeotrope.

2. A process according to claim 1, in which the temperature, at which the distillation is effected, is increased after the acrylonitrile-water azeotrope is obtained, to produce a second head fraction containing acrylonitrile, acetonitrile and water, and recycling this second fraction.

3. A process according to claim 2, in which after obtaining the second fraction, the distillation temperature is further increased to collect acetonitrile-water azeotrope, and separating the acetonitrile from this last-named azeotrope.

4. A process according to claim 3 in which the distillation is first effected at 71° C., the second fraction is obtained by raising the distillation temperature to 75° C., and the third fraction is obtained by raising the temperature to 76° C.

5. A process according to claim 1 in which the ratio of the carbonyl compound to the sum of the two nitriles is from 0.1 to 5 by weight.

6. A process according to claim 1, in which the ratio of water to the sum of the two nitriles is from 0.1 to 50 by weight.

7. A process according to claim 1, which is carried out as a batch process.

8. A process according to claim 1 which is carried out as a continuous process.

References Cited by the Examiner
UNITED STATES PATENTS

| | | | |
|---|---|---|---|
| 2,649,418 | 8/1953 | Stehman | 260—465.3 |
| 2,681,306 | 6/1954 | Kemp et al. | 203—96 |
| 3,080,301 | 3/1963 | Fontana et al. | 260—465.3 |
| 3,155,599 | 11/1964 | Cross | 264—465.3 |
| 3,185,636 | 5/1965 | Stevens et al. | 260—465.9 |

NORMAN YUDKOFF, Primary Examiner.

WILBUR L. BASCOMB, Jr., Examiner.